United States Patent [19]

Lau et al.

[11] Patent Number: 4,714,339
[45] Date of Patent: Dec. 22, 1987

[54] THREE AND FIVE AXIS LASER TRACKING SYSTEMS

[75] Inventors: Kam C. Lau, Gaithersburg; Robert J. Hocken, Barnesville, both of Md.

[73] Assignee: The United States of America as represented by the Secretary of Commerce, Washington, D.C.

[21] Appl. No.: 834,728

[22] Filed: Feb. 28, 1986

[51] Int. Cl.[4] .............................................. G01B 9/02
[52] U.S. Cl. .................................... 356/4.5; 356/358; 356/363
[58] Field of Search ................... 356/4.5, 358, 363

[56] References Cited

U.S. PATENT DOCUMENTS 4,453,085  6/1984  Pryor .
4,457,625  7/1984  Greenleaf et al. ................... 356/360

OTHER PUBLICATIONS

Automatic Measurement of the Positioning Accuracy of Industrial Robots, J. Lombard, J. C. Perrot, Annals of CIRP, vol. 32, Nov. 1983.
Laser Tracking System to Measure Robot Arm Performance, J. H. Gilby, G. A. Parker, Sensor Review, Oct. 1982.
A Survey of Current Robot Metrology Methods, K. Lau, R. J. Hocken, Annals of the CIRP, vol. 33, Feb. 1984.
A Low Cost Laser Interferometer System for Machine Tool Applications, A. Dorsey, R. J. Dorsey & M. Horowitz, National Bureau of Standards, vol. 5, No. 1, Jan. 1983.

Primary Examiner—Davis L. Willis
Assistant Examiner—Matthew W. Koren
Attorney, Agent, or Firm—Thomas Zack; Alvin Englert; Charles S. Guenzer

[57] ABSTRACT

A tracking system for measuring at least the spatial coordinates of a target and possibly the angular orientation of the target. A collimated beam is directed to the target and a mirror attached to the target reflects this beam back to a tracking point. Photosensors attached to the tracking or target point provide error signals to a servo system which controls optics at the tracking or target points to provide the direction necessary to accomplish the coincidence of the beams. An interferometer interferes the source beam with the beam that has travelled twice between the tracking and target points in order to measure the separation. By measuring the directions of the beams relative to structure attached to the tracking and target points, the target point can be located in spatial coordinates and additionally the orientation of the target structure can be determined.

15 Claims, 7 Drawing Figures

THREE AND FIVE AXIS LASER TRACKING SYSTEMS

BACKGROUND

1. Field of the Invention

The invention relates generally to laser tracking systems. In particular, it relates to a laser tracking system which can locate a target in three or five dimensions.

2. Background Art

The use of robots in manufacturing has been rapidly growing for over a decade. Commonly, robots are used for purposes of improving quality and increasing productivity. However, robots are being applied to situations where the robot design and the associated control systems are insufficietly advanced for satisfactory performance. Many robots in present use were first designed for simple operations such as pick and place or spot-welding where accuracy and kinematic performance were not crucial. However, newer robot applications, such as assembly, deburring, seam-welding, inspection, machining, drilling and the like require better performance and accuracy than that originally required of earlier robot systems. The prospective use of such systems must be able to specify robots in terms of the parameters essential for verifying that the procured robot meets these specifications before it is installed. Because of these factors, there is a growing world-wide effort to develop internationally accepted procedures and terminology to measure and describe robot performance.

One of the most difficult problems is that of determining the positional accuracy of an industrial robot throughout its large work zone. Just the fact that a robot has been instructed to assume some position does not guarantee that it has in fact done so. Several positional problems exist. The required accuracy many exceed the accuracy of the motive power. Although Pryor in U.S. Pat. No. 4,453,085 describes a robot positioning detector in rectilinear coordinates, positions in most robots are typically controlled by encoders attached to rotatable joints. The encoders may not be adequately measuring the positional change. In the extended work zone, there may be extreme positions in which a small variation in the motive power or the encoders results in large positional variations. A moving robot arm and its attached load may have large inertia. As a result, dynamic or kinematic effects may cause variations over otherwise correct static positions. Robot loads are variable and robot members have some unavoidable elasticity. Therefore, positions may be load dependent.

Although many techniques have been developed for an assessement of the accuracy of measuring machines and machine tools, these techniques are often unsuited to robots because of the less stringent accuracy requirements and a smaller work zone of the prior techniques. A particular difficulty is caused by the absence of linear axes on most robots.

The generalized problem faced in robot metrology is that of tracking a point in three-dimensional space and measuring its location. One way to accomplish this task is by attaching a reflector, hereafter called a target, to the measurement point and tracking its location optically. Several versions of the scheme have been described, such as by the present inventors in a technical article entitled "A Survey of Current Robot Metrology Methods", appearing in the Annals of the CIRP, Vol. 33, No. 2, 1984 (CIRP stands for International Conference of Production Research), or by Gilby et al. in a technical article entitled "Laser Tracking System to Measure Robot Arm Performance" appearing in Sensor Review, October 1982, pp. 180-184.

These techniques include stereo-triangulation with theodolites or photogrammetry, multiple length measurement with laser, acoustics or wires and multiple camera-like systems. Stereo-triangulation is undesirable since it requires a minimum of two tracking systems and it is a static measuring technique. Similarly, imaging by camera is undesirable since the resolution of the system is too low for robot positioning measurements.

A further positioning difficulty, somewhat unique to robots, is than in sophisticated robot arms, not only must the end of the robot arm be positioned in three-dimensional space but the tool or the like attached to the end of the arm has two or three additional degrees of rotational freedom about the end of the robot arm, namely pitch, yaw and roll. That is, the tool holder on the end of the arm must be accurately positioned in at least five degrees of freedom. The sixth degree of freedom, roll, will not be directly discussed here. Both stereo-triangulation and camera systems become relatively complicated for the extra two degrees of freedom.

SUMMARY OF THE INVENTION

Accordingly, an object of the invention is to provide an apparatus which can accurately measure positions of a remote object in at least three dimensions.

Another object of the invention is to provide an apparatus which can measure positions of a remote object in three degrees of freedom with a single optical system.

A further object of the invention is to provide an apparatus which can measure positions of a remote object in five degrees of freedom.

The invention can be summarized as an optical tracking system which uses one laser beam to track a target in three or five degrees of freedom. The measuring beam is angularly directed from a tracking point to the target to which is attached a mirror for reflecting the beam back to the tracking point. An interferometer measures interference fringes which determine the separation distance between the tracking and target points. Photosensors are provided at the tracking and target points to determine how far away from alignment is the beam incident on the target from the beam reflected from the target. Outputs of the photosensors are used in a servo control system to drive the optics associated with the tracking and target point to maintain this alignment. Encoders perform the measurement of the angles of the optics and thus of the target point relative to the tracking point. Thereby, the spatial coordinates of the target point can be measured and additionally the pitch and roll of the target can be measured.

DETAILED DESCRIPTION OF THE PREFERRED EMBODIMENTS

Figure 1:
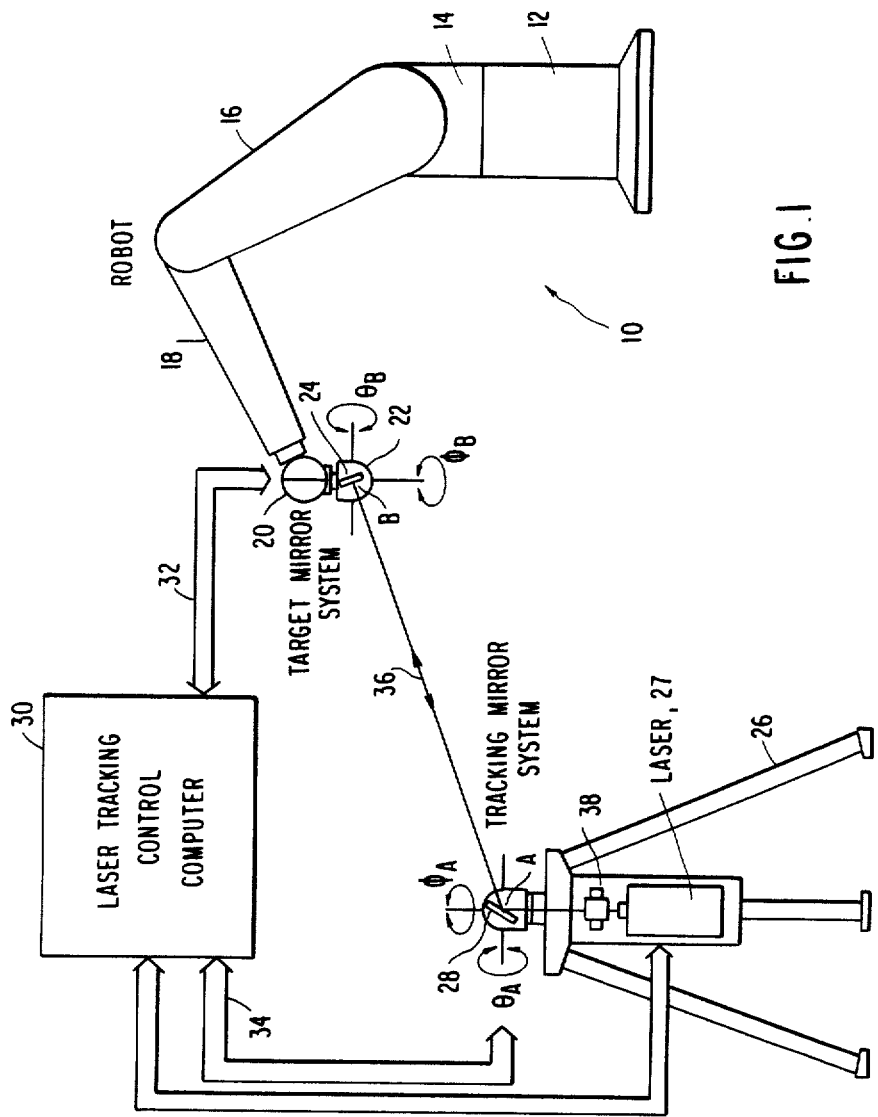
FIG. 1 is a pictorial representation of an embodiment of the present invention and the robot, the position of which is measured.

The three dimensional tracking system is a simplification of the five degree of freedom tracking system. Accordingly the five degree of freedom system will be described first. The system and the associated robot which it tracks are shown pictorially and generally in FIG. 1. A robot 10 has a base 12 on which an arm support 14 is rotatable about the vertical axis of the base 12. Attached to the arm support 14 are two arm members 16 and 18 which can rotate about horizontal axes of their hinged ends. Attached to the farther arm member 18 is a hand 20 which is rotatable in two dimensions relative to the longitudinal axis of the farther arm member 18. In use, the robot 10 would have a tool of some sort attached to the hand 20 and the controller for the robot 10 would position the tool in the space of five degrees of freedom. However, the measurement of the tracking system will be relative to a target mirror holder 22 which is in fixed relation to the tool so that a measurement of the position of the target mirror holder 22 can be easily related to the position of the tool. Within the target mirror holder 22 is a target mirror 24, which is rotatable about two orthogonal axes relative to the target mirror holder 22. A measuring point B is a central point of the target mirror 24 and is located at the position $X_B$, $Y_B$, $Z_B$ which is also the intersection of the two rotation axes of the target mirror 24. The target mirror 24 has an orientation of $\Theta_B$, $\phi_B$ with respect to a given horizontal axis and vertical axis. The combination of the horizontal and vertical axes are equivalent to the combination of the two rotation angles of the target mirror. A measurement of the five degrees of freedom $X_B$, $Y_B$, $Z_B$, $\Theta_B$ and $\phi_B$ uniquely measures the position and orientation of the target mirror 24 and hence of the tool.

The tracking system further consists of a tracking mirror system mounted on a tripod 26 to which is attached a laser 27 emitting a vertical beam to a tracking mirror 28 which can rotate about a given horizontal axis by an angle $\Theta_A$ and about a vertical axis by an angle $\phi_A$. A laser tracking control computer, easily implemented with a 16-bit data processor, has buses 32 and 34 connected respectively to the target mirror 24 and the associated microprocessor, and to tracking mirror 28 so as to direct a beam 36 reflected by the tracking mirror 28 toward the target mirror 24 and to direct the reflection of the beam 36 off the target mirror 24 back toward the tracking mirror 28. The angles $\Theta_A$ and $\phi_A$ required to accomplish such an orientation of the first pass of the beam 26 will locate the angular position of the target mirror 24 relative to the tracking mirror 28 while the angles $\Theta_B$ and $\phi_B$ locate the angular orientation of the target mirror 24 and hence of the hand 20 relative to the XYZ coordinate system.

The tracking mirror system further consists of an interferometric detector 38 which compares the initial beam emitted by the laser with the beam reflected back by the target mirror 24. The interferometric detector 38 can thus detect changes in the length L of the beam between the tracking mirror 28 and the target mirror 24. An initial absolute distance calibration is necessary in order to obtain the original length $L_o$. The measured values $\Theta_A$, $\phi_A$ and L are polar coordinates which are directly transformable into the cartesian coordinates X, Y and Z of the target mirror 24 relative to the tracking mirror 28.

Figure 2:
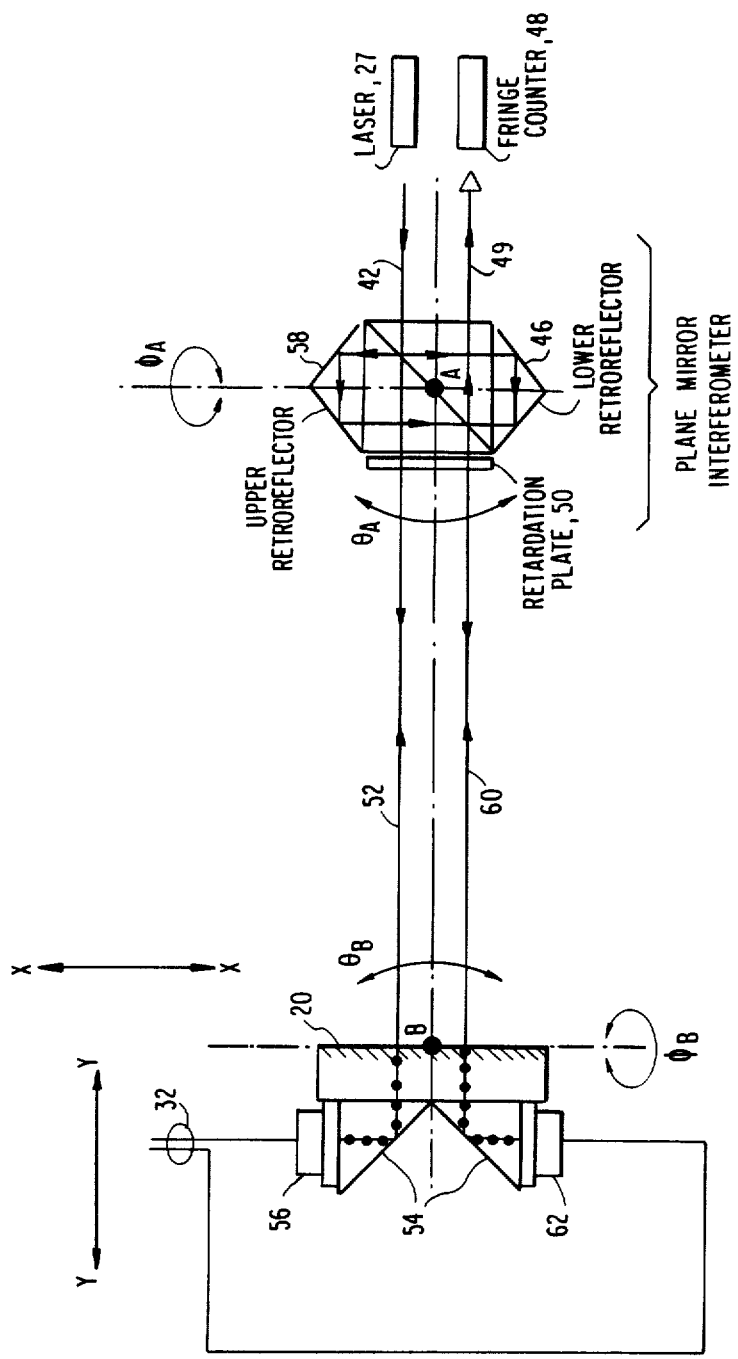
FIG. 2 is a representation of an embodiment of this invention in which the laser source is rotated.

In FIG. 2 is a schematic view of an apparatus somewhat similar to that of FIG. 1 but in which the entire tracking system is rotatable. This system can measure the distance L and the angles $\Theta_A$ and $\phi_A$ associated with the tracking system and the angle $\Theta_B$ and $\phi_B$ associated with the target mirror 20. The apparatus relies upon a dual frequency Zeeman-split plane mirror interferometer laser system, such as the Model 5501A plane mirror interferometer system available from Hewlett Packard. The frequency splitting is 1.8 MHz. The HP 5501A dual-frequency Zeeman-split laser system is not the only system that works with the plane-mirror or the single-beam interferometer optics. A stable single-frequency laser system which creates two orthogonally polarized beams will also work with the same optics. Companies currently marketing these systems are: CMX in Meriden, Conn.; Tropel GCA in Rochester, N.Y. and Soro in Europe. An older version of the single-frequency Michelson Interferometer system (which is not on the market anymore) also works with the similar optics. Companies that once produced these laser systems are: Perkin-Elmer and Spectra Physics. A Hewlett Packard Model 5526 is an older laser system that was used in testing the concept of the invention. A similar system has been described by Dorsey, et al. in a technical article entitled "A low cost laser interferometer system for machine tools applications" appearing in Precision Engineering, Vol. 5, No. 1, January 1983 at pp. 29–31. The laser 27 provides two orthogonally polarized beams in a common incident beam 42, the two beams having a small frequency difference. The incident beam 42 strikes a polarization beamsplitter 44. One of the orthogonal beams, called the reference beam, is then immediately reflected by the diagonal of the beamsplitter 44, is reflected by a lower retroreflector 46 and is then again reflected by the diagonal toward a fringe counter 48 along an output beam 49. The fringe counter 48 is a part of either one of the above-mentioned Hewlett Packard interferometer systems.

The second beam, called the measuring beam, passes the polarization beamsplitter 44 and is converted to circular polarization by a quarter-wave retardation plate 50. The measuring beam propagates along a first beam path 52 and strikes the partially transmitting target mirror 20, which preferably passes 20% of incident radiation. The component of the measuring beam which has passed the target mirror 20 is reflected 90° by a beam bender 54, whereafter it strikes a first dual-axis lateral effect photodiode 56, such as an SC/10 from United Detector Technology. The dual-axis photodiode 56 provides two output signals which together measure in two lateral dimensions where on the photodiode 56 the incident beam strikes. These two signals measure where on the target mirror 20 the measuring beam along the first beam path 52 strikes. This is the same information as the orientations $\Theta_A$ and $\phi_A$ of the polarization beam splitter 44 and the associated laser 27 and fringe counter 48. It would be preferred that the laser 27, the beamsplitter 44 and the fringe counter 48 be fixed in space with the variable orientations being provided by a tracking mirror 28 disposed along the beam path 52. However, the use of a tracking mirror 28 introduces difficulties with the embodiment of FIG. 2, namely the two beams 52 and 60.

The outputs of the first photodiode 56 which would rotate with the tracking mirror 28 are two DC voltages which are proportional to the positions of the first beam path 52 on the illustrated X axis and a Z axis perpendicular to the plane of the drawing. These voltages are converted to digital form by A/D converters and the laser tracking control computer 30 determines the amount of position offset between the desired and actual position of the beam and ultimately of the beamsplitter 44. The computer 30 then computes the appropriate error corrections for the $\Theta_A$ and $\phi_A$ axes of the beamsplitter 44. The servo control will be described in detail later.

The major portion of the measuring beam 52 is reflected by the target mirror 20. If the target mirror 20 is aligned with the beamsplitter 44, the reflected measuring beam propagates along the first beam path 52 where it again passes through the retardation plate 50. The two passages through the retardation plate 50 causes the polarization of the measuring beam to be rotated 90° from its original orientation so that the reflected measuring beam is reflected by the diagonal of the beamsplitter in the upward direction. Thereafter it is offset and reflected downward by an upper retroreflector 58 and is reflected again by the beamsplitter 44 along a second beam path 60 toward the target mirror 20. The target mirror 20 passes 20% of this beam and the passed portion is reflected by the beam bender 54 to a second dual-axis lateral effect photodiode 62. The two outputs of the second photodiode 62 primarily measure the non-squareness or angular offset of the target mirror 20 with respect to the first beam path 52. Thus, with the two signals from the second photodiode, the computer 30 can correct the orientations $\Theta_B$ and $\phi_B$ of the target mirror 20.

The 80% of the beam of the second beam path 60 reflected from the target mirror 20 again passes through the retardation plate 50, whereafter its polarization orientation is shifted 180° from its original orientation so that remainder of the reference beam passes the beamsplitter 44 to strike the fringe counter 48 along the axis of the output beam 50. This coincidence assumes that all of the orientational corrections have been made on a real-time basis. The output beamsplitter 50 contains components of both the reference and measuring beams, which have slightly different frequencies. By standard optical techniques of phase retardation, these beams can be made to interfere. The fringe counter 48 counts the number of interference fringes that pass as the separation L of the target and measuring systems are changed. Thus, once an initial value of the separation has been measured, the fringe counter 48 can determine the present value of the separation L. It is, of course, to be appreciated that the corrections in the angles $\Theta_A$, $\phi_A$, $\Theta_B$ and $\phi_B$ required to keep the optical system of FIG. 2 in alignment can be summed to provide current values of these angles. However, in practice separate encoders to be described later are used. Thus all five dimensions can be measured by a single optical beam.

If motion is restrained to a plane, such as for a fixed value of Z, then the tracking system of FIG. 2 can be simplified by using only a single dimensional linear detector and only controlling one of the angles at the tracking system and one of the angles at the target system.

Figure 3:
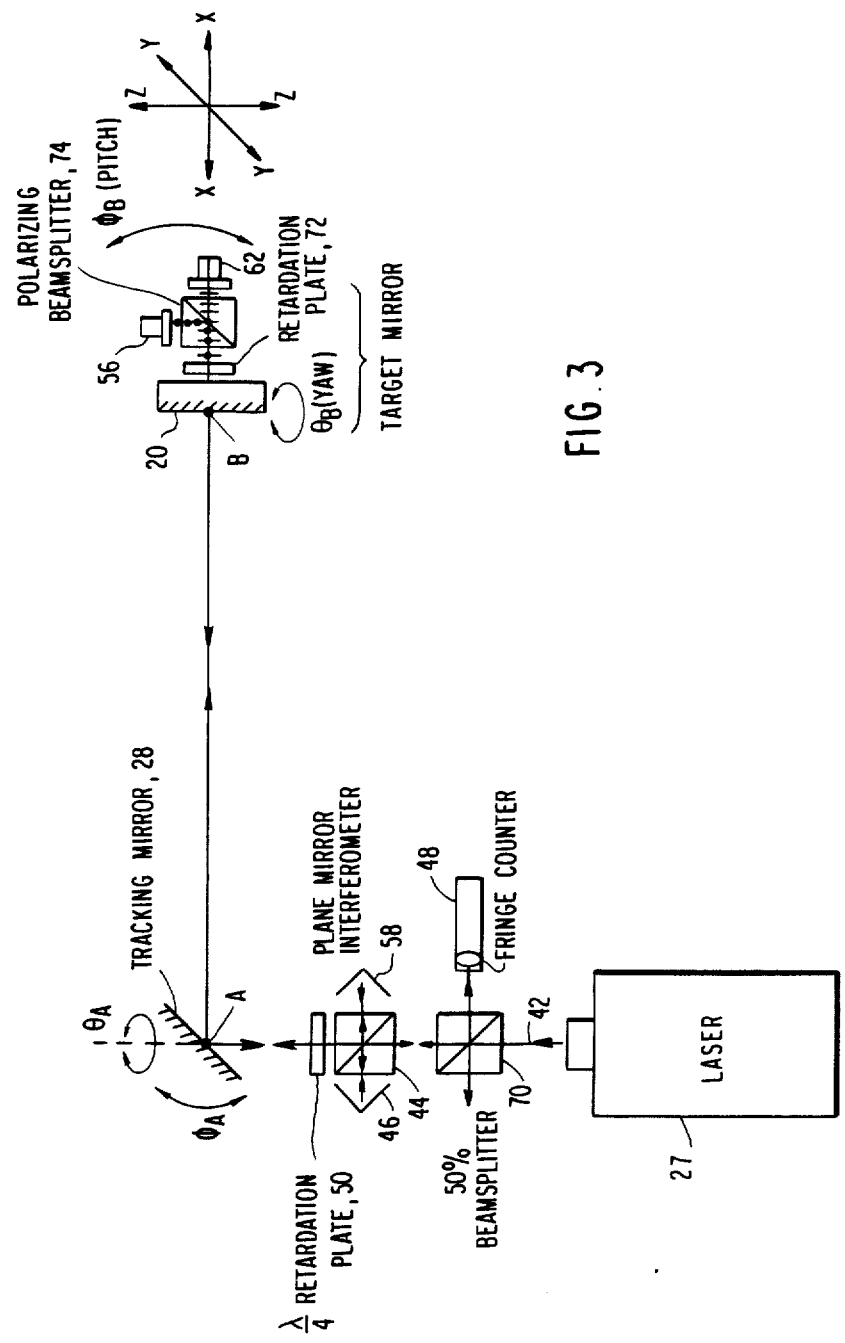
FIG. 3 is a representation of another embodiment of the invention in which the laser source is stationary and angular direction is provided by a rotatable tracking mirror.

It is obviously preferable to use a tracking mirror 28 instead of rotating the beamsplitter 44, the laser 27 and the fringe counter 48. However, such a tracking mirror 28 in the embodiment of FIG. 2 introduces the difficulty that the two beam paths 42 and 60 will rotate relative to each other as the tracking mirror rotates about the vertical axis. The difficulty can be eliminated by merging the two beam paths 52 and 60 into a single beam for which the axial rotations have no effect. This apparatus is shown in FIG. 3 and is very similar to that of FIG. 2. However, a 50% beam splitter 70 reflects 50% of the incident beam and likewise transmits 50% regardless of polarization. The reference beam is reflected from the polarization beamsplitter 44 to the retroreflector 46 and again reflected back toward the 50% beamsplitter 70, in which part is reflected to the fringe counter 48. The retroreflector 46 is required since there may be slight offsets before the angular adjustments have been made. The measuring beam is transmitted through the quarter-wave retardation plate 50 and is thereafter reflected from the rotatable tracking mirror 28. The previously described elements are all fixed and the tracking mirror 28 provides the angular adjustments for the tracking system.

The angularly directed measuring beam falls upon the target mirror 20, again having 20% transmission. The transmitted measuring beam passes through another quarter-wave retardation plate 72 so that the measuring beam is then reflected in a polarization beam splitter 74 to the first dual-axis photodiode 56. The portion of the measuring beam reflected from the target mirror 20 is directed back along its original path, assuming correct adjustments of the target mirror 20, to the polarization beamsplitter 44 which acts similarly to that FIG. 2 except that an additional reflection in the 50% beamsplitter 70 is required before the measuring beam enters the fringe counter 48. The portion of the measuring beam that is again reflected by the polarization beamsplitter 44 toward the target mirror 20 passes again through the quarter-wave plate 72 at the target. This is the fourth passage through a quarter-wave plate so that the reference beam passes the polarization beamsplitter 74 to fall on the second dual-axis photodiode 62. It is seen that in correct adjustment, none of the beams are offset from each other with the beam separation being performed by the two added beamsplitters 70 and 74.

The servo mechanism will now be described with reference to FIG. 4. In the tracking system for five degrees of freedom, four of these servo mechanisms will be required for the four angles which will be controlled. For instance, the dual-axis lateral effect photodiode 56 provides two signals $D_x$ and $D_y$, of which only $D_x$ will be discussed here. The signal $D_x$ is sampled at a rate of 200 Hz. The signal $D_x$ is amplified by an amplifier 80 and is then converted to digital form by an A/D converter 82 before being input to the control computer 30. The operations which will be described for the computer 30 will be performed as part of a software program. However, the operations will be described with reference to discrete components. The digitized signal $D_x$ is compared in a comparator 84 against a reference signal. However, for the normal situation in which the servo mechanism attempts to drive the photodiode 56 to its zero output orientation, the reference signal is a zero value. The output $\epsilon_o$ of the comparator 84, which is an error signal, is input to a proportional-integral-differential (PID) controller 86, which is a well known servo controller. The PID controller 86 produces an output signal m which is the sum of three terms, $$m = m_p + m_i + m_d. \quad (1)$$

The first term $m_p$ is the proportional term and is equal to $$m_p = k_p \cdot \epsilon_o. \quad (2)$$

The proportional term is sufficient for the servo control of a speed control motor 88 which drives the mirror 56 in the direction associated with the signal $D_x$. Of course, for the embodiment of FIG. 2, one or two of the motors 88 rotates the laser 27 and the beamsplitter 44. Any finite error term $\epsilon_o$ will cause the motor 88 to move at a proportional velocity until the error term $\epsilon_o$ disappears. The sign of the proportionality constant $k_p$ is, of course, chosen to produce motion in the direction decreasing the error term $\epsilon_o$. The magnitude of the proportionality constant will determine how quickly the error is removed.

Strictly proportional control is disadvantageous in that if the target mirror is moving at a constant velocity, because that is the motion of the robot, then the only way the motor can provide the constant velocity is to maintain a constant error term $\epsilon_o$. That is, a steady state error results from uniform velocity. To remedy this problem, an integral term $m_i$ is used which is defined as $$m_i = k_i \cdot \int_o^t \epsilon_o dt. \quad (3)$$

Thus even when $\epsilon_o = 0$, the term $m_i$ is not necessarily equal to zero.

The use of the proportional and integral terms is often done in servo control. However, the operation of the servo system can be improved even further if the differential term $m_d$ is used which is set to $$m_d = k_d \cdot d\epsilon_o/dt. \quad (4)$$

This differential term $m_d$ is used allow the use of a large proportionality constant $k_p$ in the proportional term while guarding against overshoot and noise susceptibility.

The output signal m is converted to analog form by a D/A converter 90 and controls the speed of the motor 88. However, the motor 88 has its own servo control system. The signal m is compared in a comparator 92 with an output from a tachometer 94 attached to the motor 88 so that the output of the motor speed comparator 92 is an error signal which is then amplified by an amplifier 96 and finally applied to the motor 88. The amplifier 96 provides the proportionality constant for the velocity loop error correction.

It is noted that the servo control system, as illustrated, does not provide values for the position of the mirror 20 or the associated motor 88. Instead, an encoder 98 is attached to each motor 88 which can be used to directly measure the angular position of the motor shaft with respect to the motor body and thus the tripod 26 or the robot hand 20. An encoder 98 useful for measuring the required angles is the Series ROD 250 encoder available from the Heidenhain Corporation of Elk Grove Village, Ill. A display unit 99, such as their display unit VRZ-166, is used with the encoder 98 to provide a digital value of the rotation angle.

Figure 4:
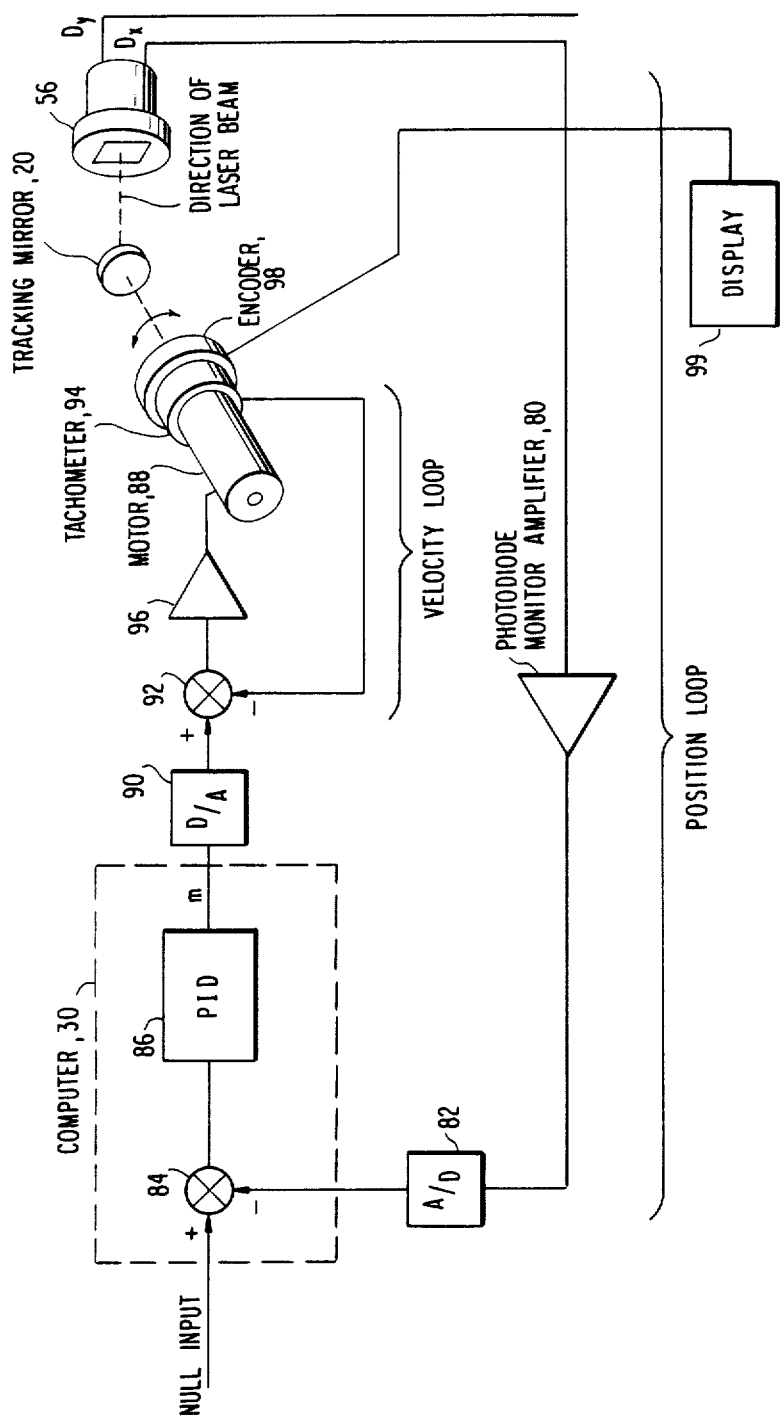
FIG. 4 is a representation of the servo control system usable with the invention.

An alternative to the servo controls of FIG. 4 is to use a stepping motor for the motor 88. A stepping motor changes by one angular increment for every pulse received. Thus no tachometer is required with a stepping motor since the computer 30 would issue a given number of pulses and hence know the resultant position of the motor.

Figure 5:
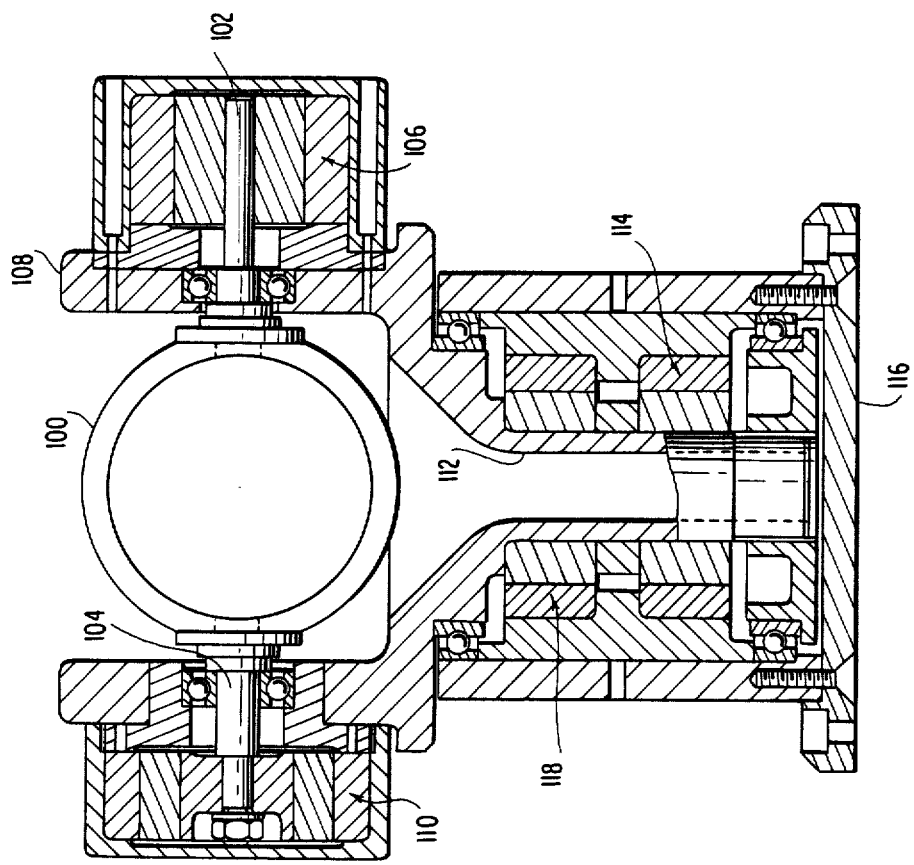
FIG. 5 is a cross-section of a gimbel mount for the tracking and target mirror.

Both of the mirrors 24 and 26 need to be controlled in two perpendicular directions. A gimbel mount, useful for this purpose, is shown in cross section in FIG. 5. A mirror holder 100 is supported at opposing ends by shafts 102 and 104. One shaft 102 is driven by a motor 106 with respect to a vertically rotatable mount 108. The motor 106 for the horizontal shaft 102 can be a DC motor, model QT-7060 having a torque of 11.6N-cm available from the Inland Company. The other shaft 104 is attached to a tachometer 110 which measures the angular velocity of the shafts 102 and 104 and of the mirror holder 100 with respect to the rotatable mount 108. Both of the tachometers 110 and 118 may be a model TG-1203 available from the Inland Company. The vertically rotatable mount 108 has an axial lower portion 112 which is rotated by a motor 114 with respect to a base 116. The motor 114 for the vertical mount 108 may be a DC motor, model QT-1207 having a torque of 19N-cm, also available from the Inland Company. A tachometer 118 measures the angular velocity of the rotatable mount 108 with respect to the base 116. The lower portion 112 of the rotatable mount 108 has a central aperture useful when the gimbel structure of FIG. 5 is being used in the tracking mirror system and the beams are directed vertically. One encoder 98 would be associated with one of the shafts 102 and 104 and with the rotatable mount 108 while an other encoder 98 would be associated with the lower portion 122 of the rotatable mount 108 and with structure rigidly attached to the base 116. A separate gimbel mount would be used for both the tracking mirror 28 and the target mirror 20.

Figure 6:
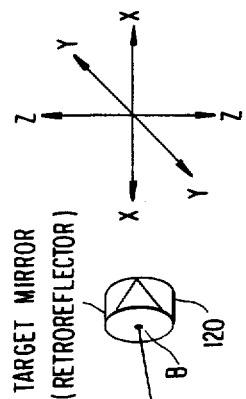
FIG. 6 is a representation of yet another embodiment of the invention in which the optics at the target are passive.
Figure 6:
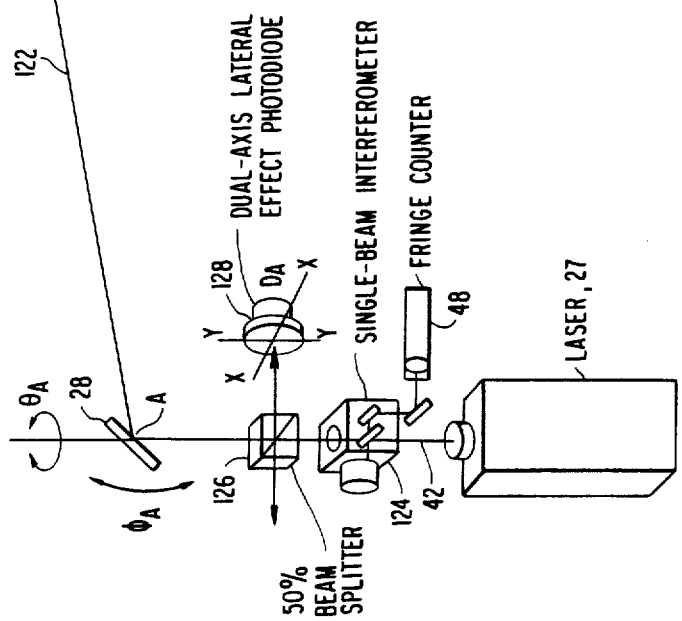
Figure 7:
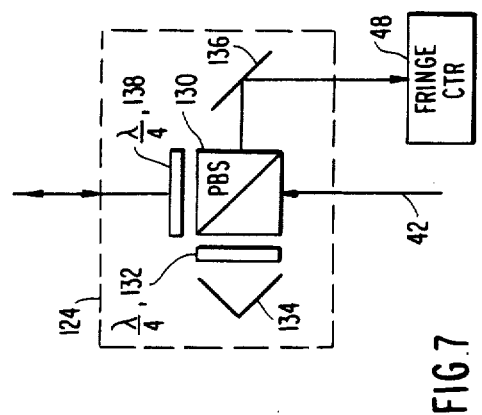
FIG. 7 is a representation of the interferometer of FIG. 6.

In some applications, it is not required to measure the pitch and roll of the robot hand 20 but only to measure its position in the XYZ coordinate system. That is, the target angles $\Theta_B$ and $\phi_B$ are not important. In this case, the target mirror system can be made completely passive by using a cat's eye or retroreflector 120, as shown in FIG. 6, attached to the robot hand 20. The orientation of the retroreflector 120 is unimportant since, within a given angular orientation, the retroreflector 120 will reflect an incident light beam 122 back along the same axis. The retroreflector 120 can be a silvered conical depression having a diameter of 25 mm. The laser 27 provides the frequency-split orthogonally polarized components in the beam 42, which then passes through a single beam interferometer 124, to be described later. The beam then enters a 50% beamsplitter 126 from which half the beam is lost but half of the beam is transmitted toward the tracking mirror 28. The tracking mirror, under servo control, redirects the beam toward the beam 122 toward the retroreflector 120 which reflects the beams back along its same path to the tracking mirror 28 and the 50% beamsplitter 126. The beamsplitter 126 reflects half the back directed light toward a dual-axis lateral effect photodiode 128 and half toward the single-beam interferometer 124. The X-axis output of the photodiode 128 is used to control the $\Theta_A$ orientation of the tracking mirror 28 and the Y-axis output is used to control the $\phi_A$ orientation. The single-beam interferometer is shown in more detail in FIG. 7. The incident beam 42 falls upon a polarization beamsplitter 130, wherein one of the polarization components, the reference component, is reflected through a quarter-wave plate 132, reflected by a retroreflector 134, and again passes through the quarter-wave plate 132. As a result, this reference beam then passes through the polarization beamsplitter 130 and is reflected by a mirror 136 to the fringe counter 48.

The other of the two polarization components, the measuring beam, in the incident beam 42 immediately passes through the polarization beamsplitter 130 and through a quarter-wave plate 138. Upon returning from the retroreflector 120 at the target, the measuring beam again passes through the quarter-wave plate 138 so that it is reflected by the polarization beamsplitter 130 to the fringe counter 48. The orientation of the retroreflector 120 at the target does not need to be controlled as long as the angle of incidence of the beam 122 does not exceed the angle of the cone of the retroreflector 120.

If the working volume of the robot is a 3×3×3 cubic meters, the tracking system is located 1.5 m from the robot, and the encoders provide a pointing accuracy of 0.4 arc second, then a target accuracy of 10 micrometers (0.0004 inch) can be obtained.

Although the original purpose of the described tracking system was to determine the accuracy of the robot's positioning detemination, the invention can also be used for controlling the robot by an accurate direct measurement of its position. Of course, the invention is not limited to the control or robots but may be applied to other movable structures, for example, machine tool measurements, large dimensional inspections, construction and surveying.

We claim:

1. A laser tracking system, comprising:
   a laser light source (27) for producing a beam (42) of coherent light having first and second beam components of different wavelengths;
   a target point (A) and a tracking point (B) having a separation therebetween;
   first optical means associated with said tracking point for reflecting said first beam component and transmitting said second beam component from said tracking point to said target point;
   second optical means associated with said target point for transmitting a first portion of said second beam component and reflecting a second portion of said second beam component toward said first optical means, said first optical means including means for reflecting said second portion of said second beam component toward said second optical means, and said second optical means including means for transmitting a first part of said second portion and reflecting a second part of said second portion;
   control means (30) for controlling said first optical means to direct said second beam component to said target point and for controlling said second optical means to reflect said second portion resultant from said second beam component back to said tracking point, said control means controlling said first and second optical means in at least two degrees of freedom;
   angular measuring means for measuring said at least two degrees of freedom; and
   means associated with one of said tracking and target points for measuring said separation from said first beam component and at least part of said second portion of said second beam component.

2. A laser system as recited in claim 1, wherein said control means controls said first optical means in at least a first two degrees of freedom and said second optical means in at least a second two degrees of freedom.

3. A laser system as recited in claim 2, wherein said angular measuring means includes a first sensor means responsive to said first portion of said second beam component for measuring said first two degrees of freedom, and a second sensor means responsive to said first part of said second portion of said second beam component for measuring said second two degrees of freedom.

4. A laser tracking system, comprising:
   a laser light source associated with a tracking point for producing a beam of coherent light;
   a first rotatable planar reflector (28) associated with said tracking point for reflecting said beam from said laser light source into a first beam;
   a second rotatable planar reflector (20) associated with a target point for reflecting a beam incident thereupon into a second beam, said tracking point and said target point being separated by a separation;
   control means for controlling said first and second reflectors to direct said first beam to said target point and to direct said second beam resultant from said first beam to said tracking point, said control means including first and second detecting means and being responsive to respective outputs thereof for respectively controlling said first and second reflectors to each rotate about at least two substantially orthogonal axes; and
   interferometric means (44,48) associated with said tracking point for measuring said separation by interfering said light beam from said laser light source before it is reflected by said first reflector with light from said second beam,
   wherein said laser system further comprises a partially reflecting mirror (74) coupled to said second planar reflector, said first detecting means receiving a portion of said first beam reflected by said partially reflecting mirror and said second detecting means receiving a portion of said first beam transmitted by said partially reflecting mirror.

5. A laser tracking system as recited in claim 4, wherein said first and second detecting means each include a linear photosensor for detecting a linear position of a beam falling thereupon.

6. A laser tracking system as recited in claim 5, wherein each of said linear photosensors is associated with said target point.

7. A laser tracking system, comprising:
   a laser light source associated with a tracking point (A) for producing a beam of coherent light;
   a first rotatable planar reflector (28) associated with said tracking point for reflecting said beam from said laser light source into a first beam;
   a retroreflector (120) associated with a target point (B) for reflecting a beam incident thereupon into a second beam anti-parallel to said incident beam, said tracking point and said target point being separated by a separation;
   control means for controlling said first reflector to direct said first beam to said retroreflector at said target point, said control means controlling said first reflector to rotate in at least two degrees of freedom, said control means including means (128) associated with said tracking point for determining the planar position of a light beam falling thereupon and receiving said second beam;

angular measuring means for measuring said at least two degrees of freedom; and interferometric means (124,48) associated with said tracking point for measuring said separation by interfering said light beam from said laser light source before it is reflected by said first reflector.

8. A laser tracking system, comprising:
a laser light source for producing an initial beam comprising two orthogonally polarized components;
a first beamsplitter receiving said initial beam on a first face thereof;
a fringe counter disposed to receive light from a second face of said first beamsplitter;
a first polarizing beamsplitter disposed to receive light on a first face thereof from a third face of said first beamsplitter;
two reflectors disposed on opposing second and third faces of said first polarizing beamsplitter;
a tracking mirror, rotatable in two directions, disposed to receive light from a fourth face of said first polarizing beamsplitter;
first means for rotating said tracking mirror in two directions;
a quarter-wave retardation plate disposed between said tracking mirror and said first polarizing beamsplitter;
a partially transmitting mirror, disposed at a target point, receiving a light beam from said tracking mirror on a first principal face;
a second polarizing beamsplitter having a first face facing a second principal face of said partially transmitting mirror;
a quarter-wave retardation plate disposed between said partially transmitting mirror and second polarizing beamsplitter;
two dual-axis linear photosensors receiving light from a second face opposing said first face and from a third face of said second polarizing beamsplitter;
second means for rotating together in two directions said partially transmitting mirror, said second polarizing beamsplitter and said two photosensors; and
means for controlling said first and second rotating means responsive to said photosensors to direct a first beam a light incident upon said tracking mirror from said first polarizing beamsplitter toward said partially reflecting mirror and to direct a second beam resultant from a reflection of said first beam from said partially reflecting mirror to said tracking mirror.

9. A method of tracking a target point, comprising:
variationally directing an initial beam of coherent light from a tracking point to said target point in a collimated incident first beam;
specularly reflecting a first portion of said first incident beam from said target point back to said tracking point in a collimated reflected second beam and transmitting a second portion of said first beam;
specularly reflecting said second beam from said tracking point to said target point in a collimated reflected third beam;
specularly reflecting a first portion of said third beam from said target point back to said tracking point in a collimated reflected fourth beam and transmitting a second portion of said third beam;
angularly controlling said directing and reflecting at said tracking and target points in at least two degrees of freedom;
measuring said degrees of freedom from said second portion of said first beam and said second portion of said third beam;
interfering said initial beam with said fourth beam; and
measuring a separation of said target point from said tracking point by measuring an interference pattern of said interfering.

10. A method of tracking as recited in claim 9, wherein said step of controlling angularly controls at least four degrees of freedom and said measuring step measures said four degrees of freedom.

11. A laser tracking system, comprising:
a laser light source associated with a tracking point (A) for producing a beam of coherent light;
interferometric means associated with said target point for reflecting a first portion of said beam from said laser light source and for transmitting a second portion of said beam from said laser light source, said first portion of said beam comprising a first beam and said second portion of said beam comprising a second beam, said interferometric means being rotatable in at least a first two degrees of freedom;
a planar reflector (20) associated with a target point (B) for receiving said second beam and reflecting it into a third beam, said tracking point and said target point being separated by a separation, said planar reflector being rotatable in at least a second two degrees of freedom;
control means for controlling said interferometric means to direct said second beam to said target point and said third beam to said tracking point, said control means including first and second detecting means and being responsive to respective outputs thereof for respectively controlling said interferometric means and said planar reflector in said first and second two degrees of freedom; and
counter means associated with said tracking point for measuring said separation by interfering said first beam with light from said third beam.

12. A laser tracking system, comprising:
a laser light source for producing an initial beam comprising first and second beams which are orthogonally polarized components of said initial beam;
an interferometer associated with a target point and including a beamsplitter for receiving said initial beam and reflecting said first beam and transmitting said second beam;
first means for rotating said interferometer in two directions;
a partially transmitting target mirror disposed at said target point for receiving said second beam from said interferometer on a first principal face thereof;
first and second photosensors receiving light transmitted by said target mirror;
second means for rotating together in two directions said target mirror and said first and second photosensors; and means for controlling said first and second rotating means responsive to said first and second photosensors to direct said second beam transmitted by said beamsplitter toward said target mirror and to direct a third beam resultant from a reflection of said first beam from said target mirror to said beamsplitter in said interferometer.

13. A laser tracking system as recited in claim 12, wherein said first photosensor receives the portion of said second beam which is transmitted by said target mirror, and said interferometer further comprises means, including said beamsplitter, for receiving said third beam and reflecting it into a fourth beam directed toward said target mirror, and said second photosensor is disposed for receiving the portion of said fourth beam transmitted by said target mirror.

14. A laser tracking system, comprising:
a laser light source associated with a tracking point for producing a beam of coherent light;
a first rotatable planar reflector associated with said tracking point for reflecting said beam from said laser light source into a first beam;
a second rotatable planar reflector associated with a target point for reflecting a beam incident thereupon into a second beam, said tracking point and said target point being separated by a separation;
control means for controlling said first and second reflectors to direct said first beam to said target point and to direct said second beam resultant from said first beam to said tracking point, said control means controlling said first and second reflectors to rotate about at least two axes; and
interferometric means associated with said tracking point for measuring said separation by interfering said light beam from said laser light source before it is reflected by said first reflector with light from said second beam,
wherein said laser system further comprises a motor for causing one of said first and second reflectors to rotate and a drive circuit for driving said motor, said control system further comprises at least two photodetectors for detecting a position of a beam incident thereon, and wherein said control means includes a proportional-integral-differential controller receiving signals from at least one of said photosensors and providing error signals to said drive circuit.

15. A laser tracking system, comprising:
a laser light source associated with a tracking point for producing a beam of coherent light;
a first rotatable planar reflector associated with said tracking point for reflecting said beam from said laser light source into a first beam;
a second rotatable planar reflector associated with a target point for reflecting a beam incident thereupon into a second beam, said tracking point and said target point being separated by a separation;
control means for controlling said first and second reflectors to direct said first beam to said target point and to direct said second beam resultant from said first beam to said tracking point, said control means controlling said first and second reflectors to rotate about at least two axes; and
interferometric means associated with said tracking point for measuring said separation by interfering said light beam from said laser light source before it is reflected by said first reflector with light from said second beam,
wherein said laser system further comprises a stepping motor for causing one of said first and second reflectors to rotate.

* * * * *

REEXAMINATION CERTIFICATE (3158th)

United States Patent
Lau et al.

[11] B1 4,714,339
[45] Certificate Issued Mar. 18, 1997

[54] THREE AND FIVE AXIS LASER TRACKING SYSTEMS

[75] Inventors: Kam C. Lau, Gaithersburg; Robert J. Hocken, Barnesville, both of Md.

[73] Assignee: The United States of America as represented by the Secretary of Commerce, Washington, D.C.

Reexamination Request:
No. 90/004,178, Mar. 12, 1996

Reexamination Certificate for:
Patent No.: 4,714,339
Issued: Dec. 22, 1987
Appl. No.: 834,728
Filed: Feb. 28, 1996

[51] Int. Cl.$^6$ .................................... G01B 9/02
[52] U.S. Cl. .................... 356/4.09; 356/358; 356/363
[58] Field of Search ........................... 356/4.09, 358, 356/363

[56] References Cited

U.S. PATENT DOCUMENTS 4,621,926  11/1986  Merry et al. ................... 356/363
4,707,129  11/1987  Hashimoto et al. .............. 356/4.5

FOREIGN PATENT DOCUMENTS 882734  11/1981  U.S.S.R. ..

*Primary Examiner*—Samuel A. Turner

[57]     ABSTRACT

A tracking system for measuring at least the spatial coordinates of a target and possibly the angular orientation of the target. A collimated beam is directed to the target and a mirror attached to the target reflects this beam back to a tracking point. Photosensors attached to the tracking or target point provide error signals to a servo system which controls optics at the tracking or target points to provide the direction necessary to accomplish the coincidence of the beams. An interferometer interferes the source beam with the beam that has travelled twice between the tracking and target points in order to measure the separation. By measuring the directions of the beams relative to structure attached to the tracking and target points, the target point can be located in spatial coordinates and additionally the orientation of the target structure can be determined.

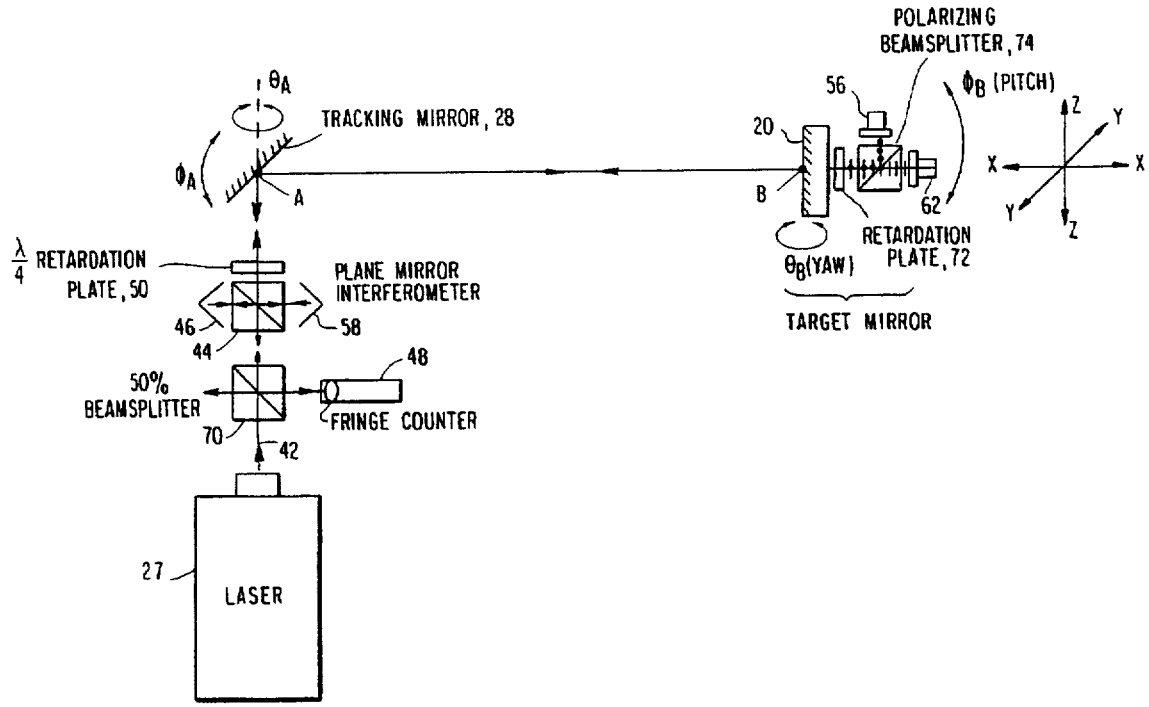

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1–15 is confirmed.

* * * * *

REEXAMINATION CERTIFICATE (4091st)

United States Patent [19]
Lau et al.

[11] B2 4,714,339
[45] Certificate Issued May 23, 2000

[54] THREE AND FIVE AXIS LASER TRACKING SYSTEMS

[75] Inventors: Kam C. Lau, Gaithersburg; Robert J. Hocken, Barnesville, both of Md.

[73] Assignee: The United States of America as represented by the Secretary of Commerce, Washington, D.C.

Reexamination Request:
No. 90/005,179, Dec. 8, 1998

Reexamination Certificate for:
Patent No.: 4,714,339
Issued: Dec. 22, 1987
Appl. No.: 06/834,728
Filed: Feb. 28, 1986

Reexamination Certificate B1 4,714,339 issued Mar. 18, 1997

[51] Int. Cl.[7] .................................... G01B 9/02
[52] U.S. Cl. .................... 356/4.09; 356/358; 356/363

[56] References Cited

U.S. PATENT DOCUMENTS

| | | |
|---|---|---|
| 3,200,698 | 8/1965 | Froome et al. . |
| 3,424,531 | 1/1969 | Bender et al. . |
| 3,514,608 | 5/1970 | Whetter . |
| 3,615,135 | 10/1971 | Frazer . |
| 3,644,043 | 2/1972 | Jones et al. . |
| 3,864,043 | 2/1975 | Russell . |
| 3,984,685 | 10/1976 | Fletcher et al. . |
| 3,984,686 | 10/1976 | Fletcher et al. . |
| 4,020,340 | 4/1977 | Cooke . |
| 4,025,193 | 5/1977 | Pond et al. . |
| 4,155,096 | 5/1979 | Thomas et al. . |
| 4,167,329 | 9/1979 | Jelalian et al. . |
| 4,386,848 | 6/1983 | Clendenin et al. . |
| 4,721,385 | 1/1988 | Jelalian et al. . |

FOREIGN PATENT DOCUMENTS

| | | |
|---|---|---|
| 0 194 941 | 9/1986 | European Pat. Off. . |
| 3205362 | 8/1983 | Germany . |
| 2173370A | 10/1986 | United Kingdom . |

OTHER PUBLICATIONS

Marquis, Optical Tracking; A Brief Survey of the Field, Applied Optics, Apr. 1966, vol. 5, No. 4, pp. 481–487, 497–506.

Cooke, Automatic Laser Tracking and Ranging System, Applied Optics, Feb. 1972, vol. 11, No. 2, pp. 277–283.

Rubin et al, A Laser Profilmeter for Digital Terrain Mapping, AGARD Conference Proceedings No. 269, 1979, pp. 29–1 to 29–11.

Sullivan, Infrared Coherent Radar, SPIE vol. 227, $CO_2$ Laser Devices and Applications, 1980, pp. 148–161.

Steinvall et al, Experimental Studies with a Coherent $CO_2$ Laser Radar, SPIE vol. 300, Physics and Technology of Coherent Infrared Radar, 1981, pp. 100–109.

(List continued on next page.)

Primary Examiner—Samuel A. Turner

[57] ABSTRACT

A tracking system for measuring at least the spatial coordinates of a target and possibly the angular orientation of the target. A collimated beam is directed to the target and a mirror attached to the target reflects this beam back to a tracking point. Photosensors attached to the tracking or target point provide error signals to a servo system which controls optics at the tracking or target points to provide the direction necessary to accomplish the coincidence of the beams. An interferometer interferes the source beam with the beam that has travelled twice between the tracking and target points in order to measure the separation. By measuring the directions of the beams relative to structure attached to the tracking and target points, the target point can be located in spatial coordinates and additionally the orientation of the target structure can be determined.

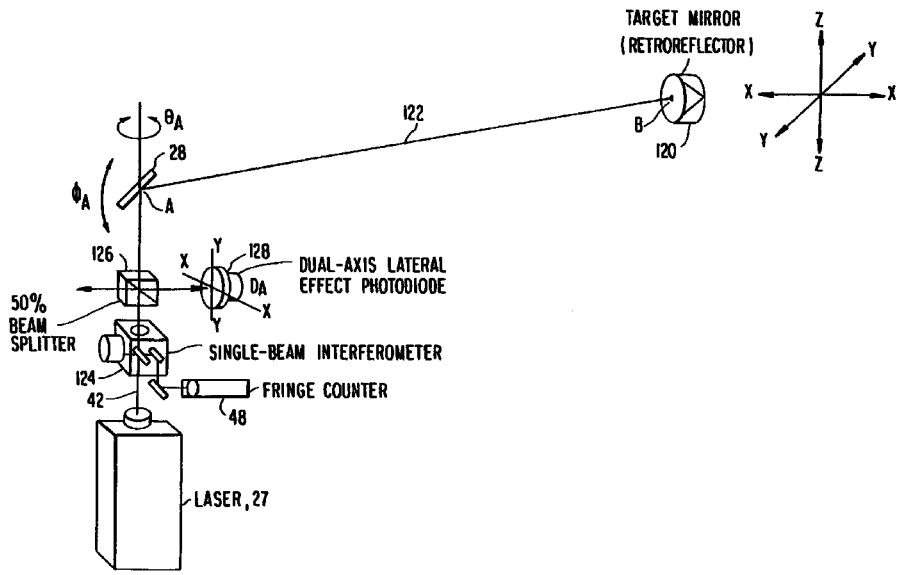

OTHER PUBLICATIONS

Anderson et al, Application of Laser Interferometry to Robotics, SPIE vol. 360, Robotics and Industrial Inspection, 1982, pp. 207–213.

Renhorn et al, Performance Study of a Coherent Laser Radar, SPIE vol. 415, Coherent Infrared Radar Systems and Applications II, 1983, pp. 39–50.

Isik et al, Force and Optical Position Sensors: Limitations of Sensors and Sensing Systms in Robotic Applications, Report No. DOE/ER/10013–T2 (1982), published by National Technical Information Service, Order No. DE84012290 (Aug. 31, 1984).

Thomas W. Barnard and Carroll R. Fencil, "Digital Laser Ranging and Tracking Using a Compound Axis Servomechanism," Applied Optics, vol. 5, No. 4, Apr., 1996, pp. 497–506.

R. F. Lucy et al., "Precision Laser Automatic Tracking System," Applied Optics, vol. 5, No. 4, Apr. 1966, pp. 517–524 and 544.

R.A. Lewis and A. R. Johnston, "A Scanning Laser Rangefinder for a Robotic Vehicle," 5$^{th}$ International Conference on Artificial Intelligence, 1977, pp. 762–768.

A. Greve and W. Harth, "Modulated Laser Surface Surveying System for mm–Wavelength Radio Telescopes," European Conference on Optical Systems and Applications, 1980, SPIE vol. 236, pp. 110–112 with 2 page attachment.

Allen H. Greenleaf, "Self–Calibrating Surface Measuring Machine," Advanced Technology Optical Telescopes, SPIE vol. 332, 1982, pp. 327–334.

K. Lau et al., "Automatic Laser Tracking Interferometer System for Robot Metrology," Precision Engineering, vol. 8, No. 1, 1986, pp. 3–8.

Leo J. Sullivan, "Firepond Laser Radar," Laser Radar Systems Professional Program Session Record, Electro/81, Apr. 7–9, 1981, pp. 1–12.

Robert H. Kingston and Leo J. Sullivan, "Coherent Infrared Radar," 33–1–33–9.

*3820A Electronic Total Station*, Operating Manual, Hewlett–Packard Company, 1977, pp. 1–75.

*Surfitek—A Self–Calibrating Surface Measurement System—Bridging the Gap Between Mechanical Measurement and Interferometry*, Itek Optical Systems, 4 pages.

Getting Set for Automated Manfuacturing, *Machine Design*, Nov. 11, 1982, 11 pages.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–15 is confirmed.

* * * * *